US010317976B2

(12) United States Patent
Schluessler et al.

(10) Patent No.: US 10,317,976 B2
(45) Date of Patent: *Jun. 11, 2019

(54) METHOD, APPARATUS, AND SYSTEM FOR ENERGY EFFICIENCY AND ENERGY CONSERVATION INCLUDING POWER AND PERFORMANCE BALANCING BETWEEN MULTIPLE PROCESSING ELEMENTS AND/OR A COMMUNICATION BUS

(71) Applicant: Intel Corporation, Santa Clara, CA (US)

(72) Inventors: Travis T. Schluessler, Hillsboro, OR (US); Russell J. Fenger, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,876

(22) Filed: Jun. 2, 2017

(65) Prior Publication Data
US 2017/0364133 A1    Dec. 21, 2017

Related U.S. Application Data

(63) Continuation of application No. 14/526,040, filed on Oct. 28, 2014, now Pat. No. 9,703,352, which is a
(Continued)

(51) Int. Cl.
*G06F 1/32*  (2019.01)
*G06F 9/50*  (2006.01)
(Continued)

(52) U.S. Cl.
CPC ............ *G06F 1/3206* (2013.01); *G06F 1/206* (2013.01); *G06F 1/3203* (2013.01); *G06F 1/329* (2013.01);
(Continued)

(58) Field of Classification Search
None
See application file for complete search history.

(56) References Cited

U.S. PATENT DOCUMENTS 5,502,838 A * 3/1996 Kikinis .............. G05D 23/1919
713/501
5,758,133 A    5/1998 Evoy
(Continued)

FOREIGN PATENT DOCUMENTS

CN    101609545    12/2009
CN    101794167    6/2011
(Continued)

OTHER PUBLICATIONS

Taiwan Intellectual Property Office, Office Action dated Feb. 18, 2016 in Taiwan Patent Application No. 101147519. (Translation Redacted).
(Continued)

*Primary Examiner* — Kim Huynh
*Assistant Examiner* — Danny Chan
(74) *Attorney, Agent, or Firm* — Trop, Pruner & Hu, P.C.

(57) ABSTRACT

An apparatus, method and system is described herein for efficiently balancing performance and power between processing elements based on measured workloads. If a workload of a processing element indicates that it is a bottleneck, then its performance may be increased. However, if a platform or integrated circuit including the processing element is already operating at a power or thermal limit, the increase in performance is counterbalanced by a reduction or cap in another processing elements performance to maintain compliance with the power or thermal limit. As a result, bottlenecks are identified and alleviated by balancing power allocation, even when multiple processing elements are operating at a power or thermal limit.

16 Claims, 10 Drawing Sheets

Related U.S. Application Data continuation of application No. 13/398,641, filed on Feb. 16, 2012, now Pat. No. 8,898,494, which is a continuation-in-part of application No. 13/327,670, filed on Dec. 15, 2011, now Pat. No. 9,304,570.

(51) Int. Cl.

| | | |
|---|---|---|
| *G06F 1/3206* | (2019.01) | |
| *G06F 1/20* | (2006.01) | |
| *G06F 1/3287* | (2019.01) | |
| *G06F 1/329* | (2019.01) | |
| *G06F 1/3203* | (2019.01) | |
| *G06F 1/3234* | (2019.01) | |

(52) U.S. Cl.
CPC .......... *G06F 1/3253* (2013.01); *G06F 1/3287* (2013.01); *G06F 9/5094* (2013.01); *G06F 9/50* (2013.01); *Y02D 10/16* (2018.01); *Y02D 10/171* (2018.01); *Y02D 10/22* (2018.01); *Y02D 10/24* (2018.01)

(56) References Cited

U.S. PATENT DOCUMENTS

| | | | |
|---|---|---|---|
| 7,558,966 B2 | 7/2009 | Durham et al. | |
| 7,692,457 B2 | 4/2010 | To et al. | |
| 7,818,596 B2 | 10/2010 | Fenger et al. | |
| 7,917,789 B2 | 3/2011 | Fenger et al. | |
| 8,185,215 B2 | 5/2012 | Burchard et al. | |
| 8,199,158 B2* | 6/2012 | Samson | G06F 1/3203 345/519 |
| 8,281,170 B1 | 10/2012 | Donovan | |
| 2003/0210248 A1 | 11/2003 | Wyatt | |
| 2004/0121797 A1 | 6/2004 | Gupta | |
| 2005/0060594 A1 | 3/2005 | Barr | |
| 2005/0264316 A1* | 12/2005 | Atkinson | G06F 13/4072 326/30 |
| 2005/0283561 A1* | 12/2005 | Lee | G06F 1/206 710/307 |
| 2006/0069936 A1 | 3/2006 | Lint et al. | |
| 2006/0143486 A1 | 6/2006 | Lamdan et al. | |
| 2007/0074011 A1 | 3/2007 | Borkar et al. | |
| 2008/0001795 A1 | 1/2008 | Arabi et al. | |
| 2008/0005592 A1 | 1/2008 | Allarey et al. | |
| 2008/0022140 A1* | 1/2008 | Yamada | G06F 1/206 713/322 |
| 2008/0094412 A1 | 4/2008 | Jiao et al. | |
| 2008/0104428 A1 | 5/2008 | Naffziger | |
| 2008/0218254 A1 | 9/2008 | Wu | |
| 2009/0007120 A1 | 1/2009 | Fenger et al. | |
| 2009/0109230 A1 | 4/2009 | Miller et al. | |
| 2009/0150689 A1 | 6/2009 | Simeral et al. | |
| 2009/0309885 A1 | 12/2009 | Samson et al. | |
| 2009/0327779 A1 | 12/2009 | Footenot et al. | |
| 2010/0115293 A1 | 5/2010 | Rotem et al. | |
| 2010/0115304 A1* | 5/2010 | Finkelstein | G06F 1/206 713/320 |
| 2010/0131781 A1 | 5/2010 | Memon et al. | |
| 2010/0162023 A1 | 6/2010 | Rotem et al. | |
| 2011/0022833 A1 | 1/2011 | Nussbaum et al. | |
| 2011/0022857 A1* | 1/2011 | Nussbaum | G06F 1/3203 713/300 |
| 2011/0040940 A1* | 2/2011 | Wells | G06F 12/084 711/128 |
| 2011/0090640 A1 | 4/2011 | Samson et al. | |
| 2011/0113274 A1 | 5/2011 | Burchard et al. | |
| 2011/0130413 A1 | 6/2011 | Nakao | |
| 2011/0153529 A1 | 6/2011 | Bracy et al. | |
| 2011/0153984 A1 | 6/2011 | Wolfe et al. | |
| 2011/1131427 | 6/2011 | Jorgenson et al. | |
| 2011/0191603 A1 | 8/2011 | Cher et al. | |
| 2011/0289380 A1 | 11/2011 | Wilkerson et al. | |
| 2011/0310413 A1 | 12/2011 | Nakao | |
| 2012/0159264 A1 | 6/2012 | Azam et al. | |
| 2012/0166832 A1* | 6/2012 | Henry | G06F 1/3296 713/320 |
| 2012/0324248 A1 | 12/2012 | Schluessler et al. | |
| 2013/0003559 A1* | 1/2013 | Matthews | H04L 43/0876 370/241 |
| 2013/0007475 A1 | 1/2013 | Ganesan et al. | |
| 2013/0061064 A1* | 3/2013 | Ananthakrishnan | G06F 1/26 713/300 |
| 2013/0106881 A1 | 5/2013 | Hendry | |
| 2014/0040643 A1 | 2/2014 | Rotem et al. | |

FOREIGN PATENT DOCUMENTS

| | | |
|---|---|---|
| CN | 102110013 | 6/2011 |
| TW | 200828116 | 7/2008 |
| TW | 201032038 | 9/2010 |
| TW | 201107957 | 3/2011 |
| TW | 201135446 | 10/2011 |
| WO | 2013090379 | 6/2013 |

OTHER PUBLICATIONS

State Intellectual Property Office, P.R. China, Office Action dated Feb. 3, 2016, in Chinese Patent Application No. 201280069930.1.
China Patent Office, Chinese Office Action dated Apr. 23, 2013, in Chinese Patent Application No. 201220697195.6.
International Searching Authority, "Notification of Transmittal of the International Search Report and the Written Opinion of the International Searching Authority," dated Apr. 30, 2013, in International application No. PCT/US2012/069164.
U.S. Patent and Trademark Office, Office Action dated Aug. 14, 2015 and Reply filed Oct. 30, 2015, in U.S. Appl. No. 13/327,670.
Schluessler et al., "Limiting CPU Power Consumption for Efficient Computation of 3D Workloads", IEEE International Conference on Energy Aware Computing, IEEE, Dec. 3-5, 2012, Guzelyurt, Cyprus.
Taiwan Intellectual Property Office, Decision of Rejection dated Jun. 16, 2016 in Taiwanese Patent Application No. 101147519. (Translation Redacted).
The State Intellectual Property Office of The People's Republic of China, Second Office Action dated Sep. 8, 2016, in Chinese Patent Application No. 201280069930.1.

* cited by examiner

METHOD, APPARATUS, AND SYSTEM FOR ENERGY EFFICIENCY AND ENERGY CONSERVATION INCLUDING POWER AND PERFORMANCE BALANCING BETWEEN MULTIPLE PROCESSING ELEMENTS AND/OR A COMMUNICATION BUS

This application is a continuation of U.S. patent application Ser. No. 14/526,040, filed Oct. 28, 2014, which is a continuation of U.S. patent application Ser. No. 13/398,641, filed Feb. 16, 2012, now U.S. Pat. No. 8,898,494, issued Nov. 25, 2014, which is a continuation-in-part of U.S. patent application Ser. No. 13/327,670, filed Dec. 15, 2011, now U.S. Pat. No. 9,304,570, issued Apr. 5, 2016, the content of which is hereby incorporated by reference.

TECHNICAL FIELD

This disclosure pertains to energy efficiency and energy conservation in integrated circuits, as well as code to execute thereon, and in particular but not exclusively, to balancing power and performance between processing elements and/or a communication bus.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume a substantial amount of the entire electricity supply for the United States of America.

As a result, there is a vital need for energy efficiency and conservation associated with integrated circuits. And as servers, desktop computers, notebooks, ultrabooks, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on economic systems.

Furthermore, as integrated circuit density has grown, the ability to consolidate multiple devices in a single integrated circuit and/or package has similarly increased. As an illustrative example, system on chip (SOC) devices have recently gained popularity. However, often SOCs (and like components) integrate multiple devices into a single device/circuit, but they also inherit each individual device's power, performance, and thermal constraints. Therefore, a device with a host processor and a graphics processor usually implements power savings policies individually and separately. And even if a power policy is defined for the entire package, it often only contemplates assumed power requirements for each of the individual devices without balancing power and performance amongst asymmetric cores to achieve maximum overall performance.

BRIEF DESCRIPTION OF THE DRAWINGS

The present invention is illustrated by way of example and not intended to be limited by the figures of the accompanying drawings.

DETAILED DESCRIPTION

Figure 1:
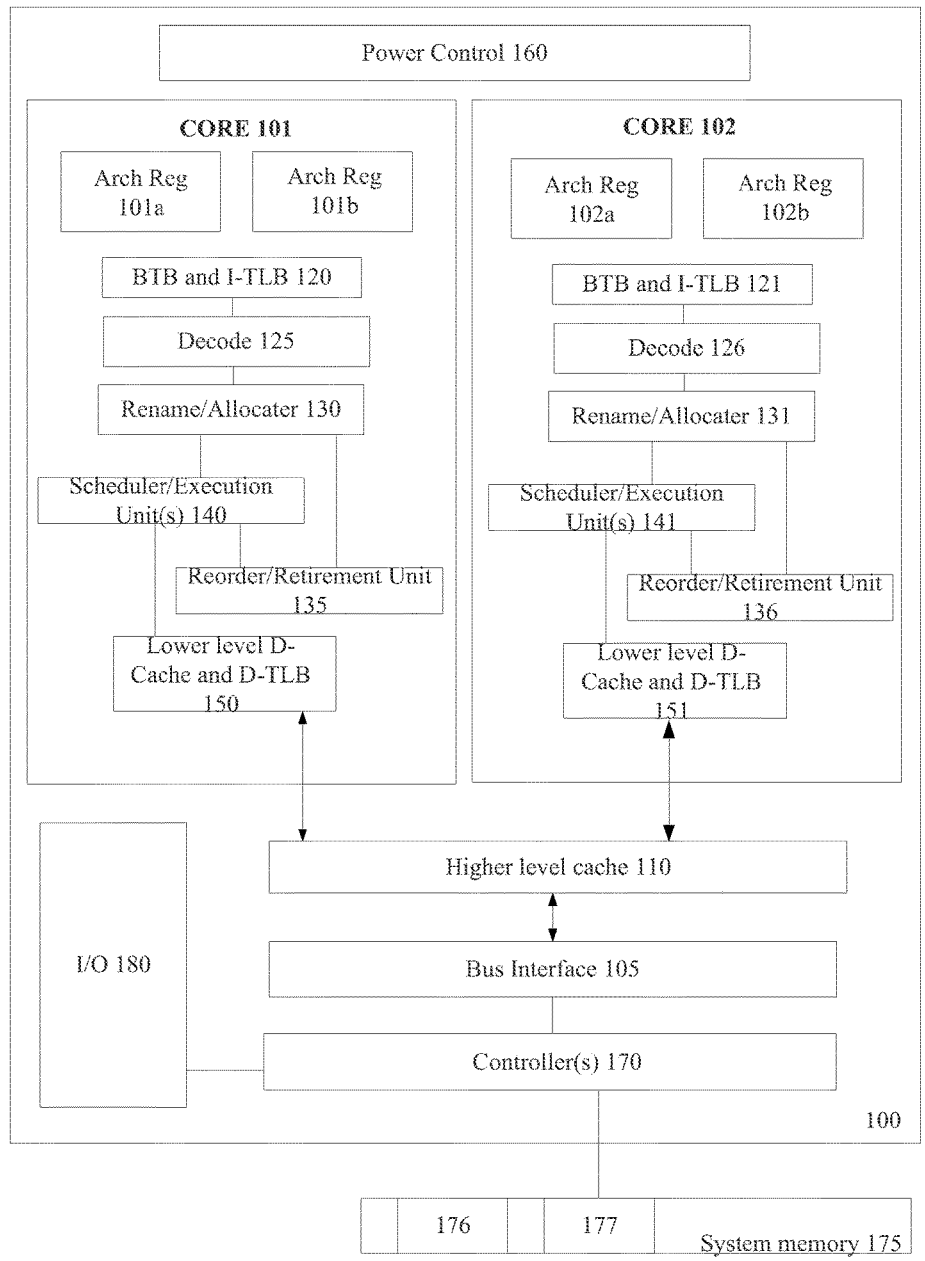
FIG. 1 illustrates an embodiment of a logical representation of a system including an integrated circuit having a multi-processing element processor and integrated graphics processor.

In the following description, numerous specific details are set forth, such as examples of specific types of specific processor and system configurations, specific hardware structures, specific architectural and micro architectural details, specific register configurations, specific structures for determining workloads, specific modules to determine and set performance/power limits, specific types of performance limits, specific types of processing devices, specific types of program code, specific performance bottleneck assumptions, specific devices including asymmetric processors, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific workload determination, specific frequency setting techniques, specific power limit determination and implementation algorithms, and other specific operational details of processors haven't been described in detail in order to avoid unnecessarily obscuring the present invention.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

The method and apparatus described herein are for balancing power between multiple asymmetric devices to achieve maximum overall performance. Specifically, power balancing and allocation is primarily discussed below in reference to an integrated circuit and/or package including a central/host processor (or cores thereof) and a graphics processor (or cores thereof). Yet, the apparatuses and methods described herein are not so limited, as they may be implemented in conjunction with any integrated circuit device including any type of asymmetric or symmetric processing cores. For example, power balancing and allocation, as described herein, may be utilized between two host processing cores, between processing cores and memory, and/or between integrated I/O devices. And as discussed above, it may be utilized in servers, desktops, ultrabooks, tablets, small form-factor devices, handheld devices, SOCs, or embedded applications.

Referring to FIG. 1, an embodiment of an integrated circuit (or package) including multiple devices/cores is illustrated. Integrated Circuit (IC) 100 includes any processor or processing device, such as a microprocessor, an embedded processor, a digital signal processor (DSP), a network processor, a handheld processor, an application processor, a co-processor, or other device to execute code. Processor 100, in one embodiment, includes at least two central, host, or processing cores—core 101 and 102, which may be asymmetric cores or symmetric cores (the illustrated embodiment), as well as an Input/Output (I/O) device 180, such as a graphics processor (or cores thereof). However, IC 100 may include any number of processing elements that may be symmetric or asymmetric.

In one embodiment, a processing element refers to hardware or logic to support a software thread. Or in another embodiment a processing element refers to a core or processing logic of a device, such as a graphics processor/core, network controller, embedded processor, microcontroller, etc. Other Examples of hardware central processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A processing (or central processing unit) core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical package 100, as illustrated in FIG. 1, includes two processing cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocator logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105. Historically, controller 170, which is described in more detail below, has been included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as mutli-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static RAM (SRAM), non-volatile memory (NV memory), and other known storage devices. Similar to the discussion above, I/O device(s) 180 have been traditionally included in a computing system external to a central processing unit. Here, device 180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 and I/O device 180 are illustrated as part of processor 100. Recently, as more logic and devices are being integrated on a single die, such as System on a Chip (SOC), each of these devices may be incorporated on processor 100 to form a single package or single integrated circuit with multiple devices. For example in one embodiment, memory controller hub 170 and a graphics processor/device 180 are included on the same package and/or die with a central processor unit to form IC 100, which may be referred to herein as processor 100 that includes an integrated memory controller 170 and graphics device 180. Here, a portion of the core (an on-core portion) includes one or more controller(s) 170 for interfacing with other devices such as memory 175 and/or a graphics device 180. The configuration including an interconnect and controllers for interfacing with such devices is often referred to as an on-core (or un-core configuration). As an example, bus interface 105 includes a ring interconnect with a memory controller for interfacing with memory 175 and a graphics controller for interfacing with graphics processor 180. And graphics processor 180 may even have direct access to cache 110. Yet, in the SOC environment, even more devices, such as the network interface, co-processors, memory 175, graphics processor 180, and any other known computer devices/interface may be integrated on a single die or integrated circuit to provide small form factor with high functionality and low power consumption. And as discussed in more detail below, when power policies are developed for the entire IC 100, the techniques for power balancing between prominent, integrated devices, such as cores 101-102 and graphics device 180 become even more important.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In one embodiment, power control module 160, which may include hardware, firmware, software, or a combination thereof, is able to balance and allocate power/frequency between devices of IC 100 to achieve maximum performance; even when IC 100 is under a power limit. Additionally, such allocation, in one scenario, is based on actual workload of devices, instead of assumptions of workload or power consumption. For example, a power limit (either a maximum power limit or a reduced limit during power saving modes) is provided for IC 100. Previously, a maximum current (and as a corollary frequency) was reduced for all processing elements of IC 100 to meet the power limit. Instead, in this scenario, a device that is determined to be a bottleneck for performance, such as throughput performance as viewed from the perspective of an application, is allocated more current/frequency, while the other competing device is capped/limited to ensure the power limit is still met. In other words, a dynamic balance is continuously stuck between devices to ensure the device that needs more resources for better overall performance is allocated such extra resources, while other devices are 'balanced' (reduced in performance) to meet a given power limit.

As a specific illustrative example, assume that I/O device 180 is a graphics processor. Here, processing cores 101, 102 and graphics device 180 form a producer and consumer relationship. Cores 101,102 receive and process instructions; some of which are offloaded to graphics processor 180 for processing (e.g. CPU cores 101, 102 send a pixel to GPU 180 to be textured, GPU 180 calculates a texture of the pixel to obtain a texel). Therefore, if the CPU cores 101, 102 are overworking (i.e. producing too much work for the GPU 180 to handle at its current performance level), then overall performance from a maximum potential is degraded (the extra performance that the CPU cores 101-102 are utilizing to overproduce could have been allocated to GPU 180). Note that this overproducing scenario potentially occurs even when CPU cores 101, 102 are operating at the same or lower frequency than GPU 180. And inversely, if CPU cores 101, 102 are under-producing (i.e. not generating enough work to keep GPU 180 busy), then once again the maximum potential performance is likely not being achieved. Moreover, the producer-consumer relations may also be view from the other perspective, where CPU cores 101,102 are to consume graphics output from producer 180 before CPU cores 101, 102 can make further forward progress.

Therefore, in one embodiment, processing workload of cores 101-102 and graphics workload of graphics device 180 are determined. For example, an amount of activity (e.g. number of cycles active) over a quantum or period of time is determined for both cores 101-102 and graphics core 180. And based on those workloads, performance of cores 101-102 and graphics core 180 are balanced to achieve maximum overall performance. As an illustrative example, if one of the devices (CPU cores 101-102 or GPU cores 180) are working at or near the maximum, while the other device is not fully occupied, then the near maximum device is allocated more performance (e.g. more frequency).

Note that when a power limit exists and IC 100 is not up against the power limit, the immediately aforementioned increase in performance may not include a counterbalancing reduction in the other device. For example, assume GPU cores 180 are fully occupied (all cycles during a period of time are active) and CPU cores 101-102 are only active 70% of the cycles during the period of time. In this scenario, CPU cores 101-102 are not working at their full capacity, but are still overproducing for GPU 180. When IC 100 is not at a set power limit, then GPU 180 frequency, in one embodiment, is increased to meet the overproduction of CPU 101-102. However, once GPU 180 starts consuming at a higher rate, CPU cores 101-102 are able to produce at even a higher rate. And if a power or thermal limit for IC 100 is reached, then if GPU 180 is to increase frequency (e.g. from the same assumptions above), then CPU 101-102, in one embodiment, are limited/capped to ensure the power or thermal limit is not exceeded. However, the power and performance within that limit are intelligently allocated to ensure maximum, 'balanced' performance.

Figure 2:
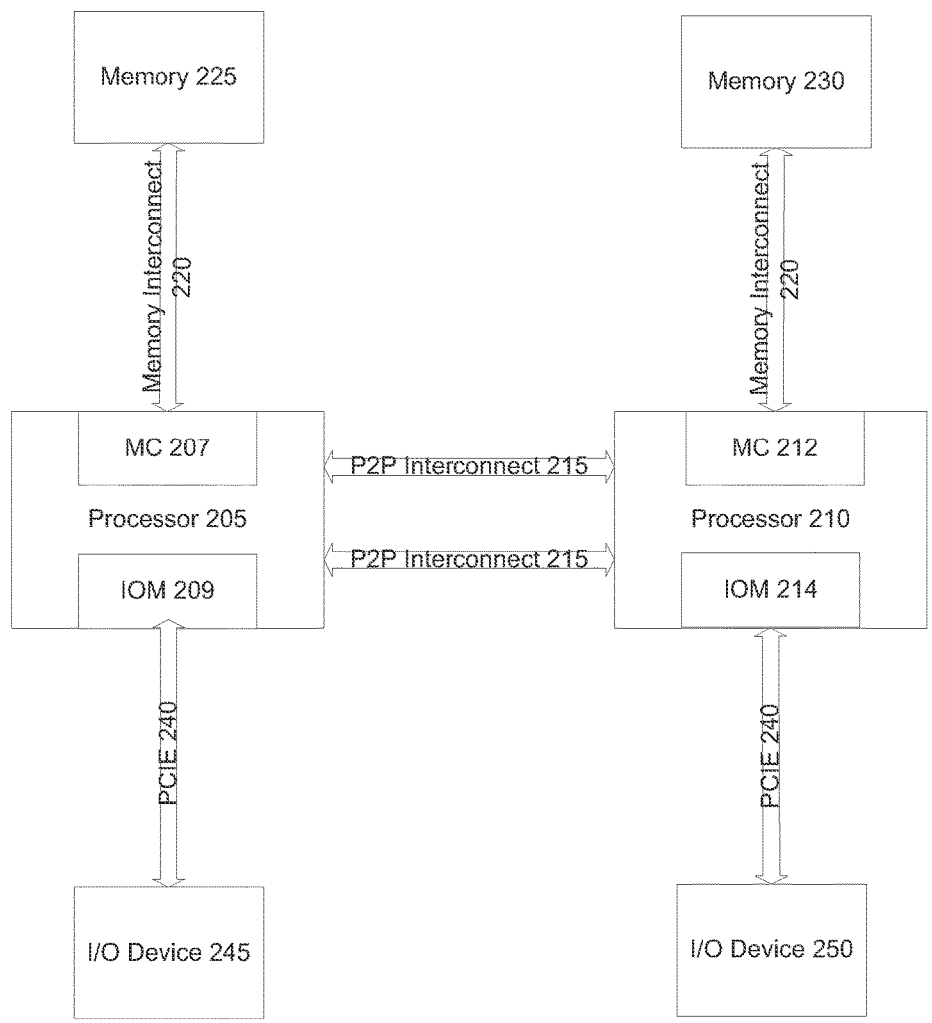
FIG. 2 illustrates an embodiment of a logical representation of a computer system configuration.
Figure 3:
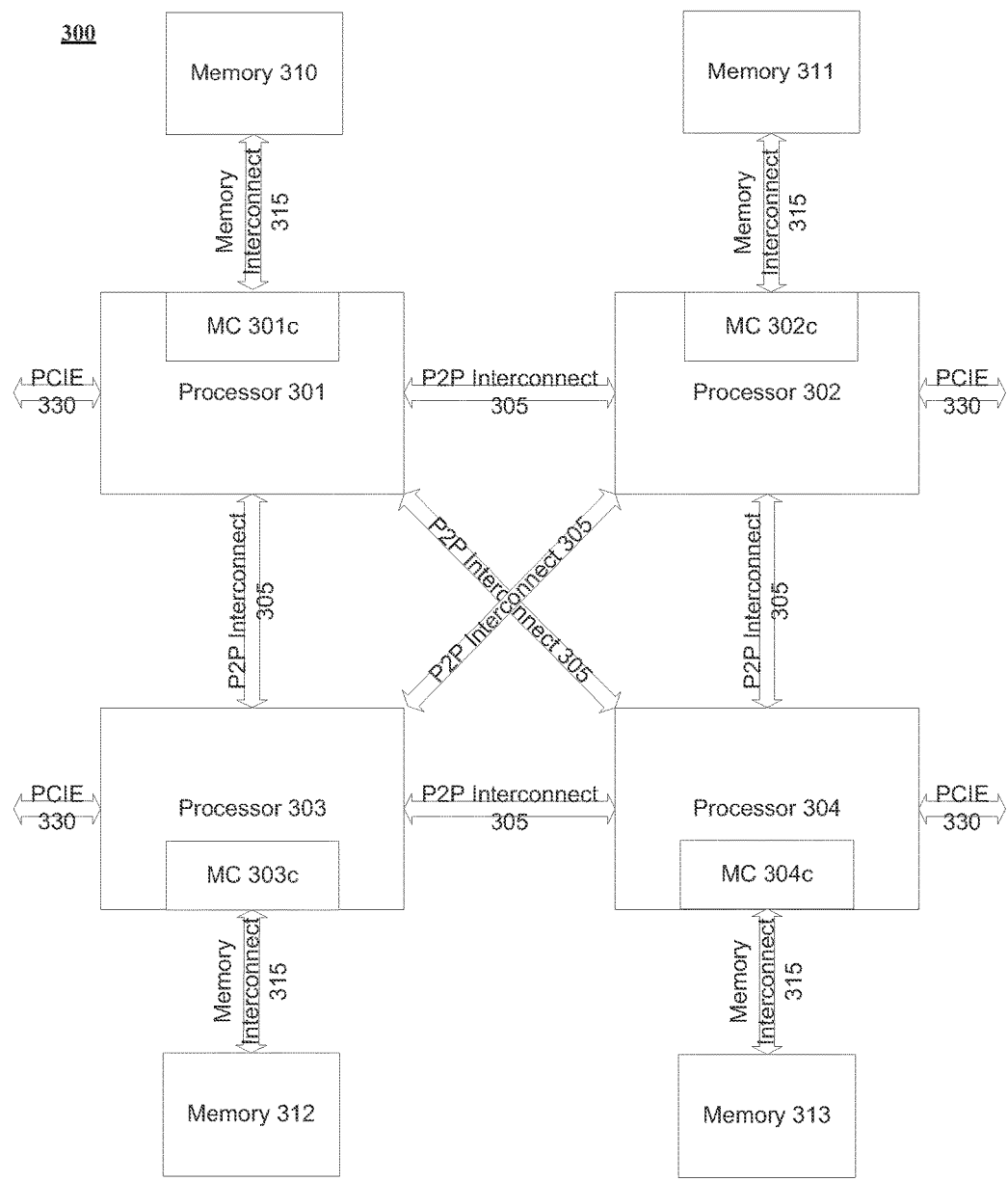
FIG. 3 illustrates another embodiment of a logical representation of a computer system configuration.
Figure 4:
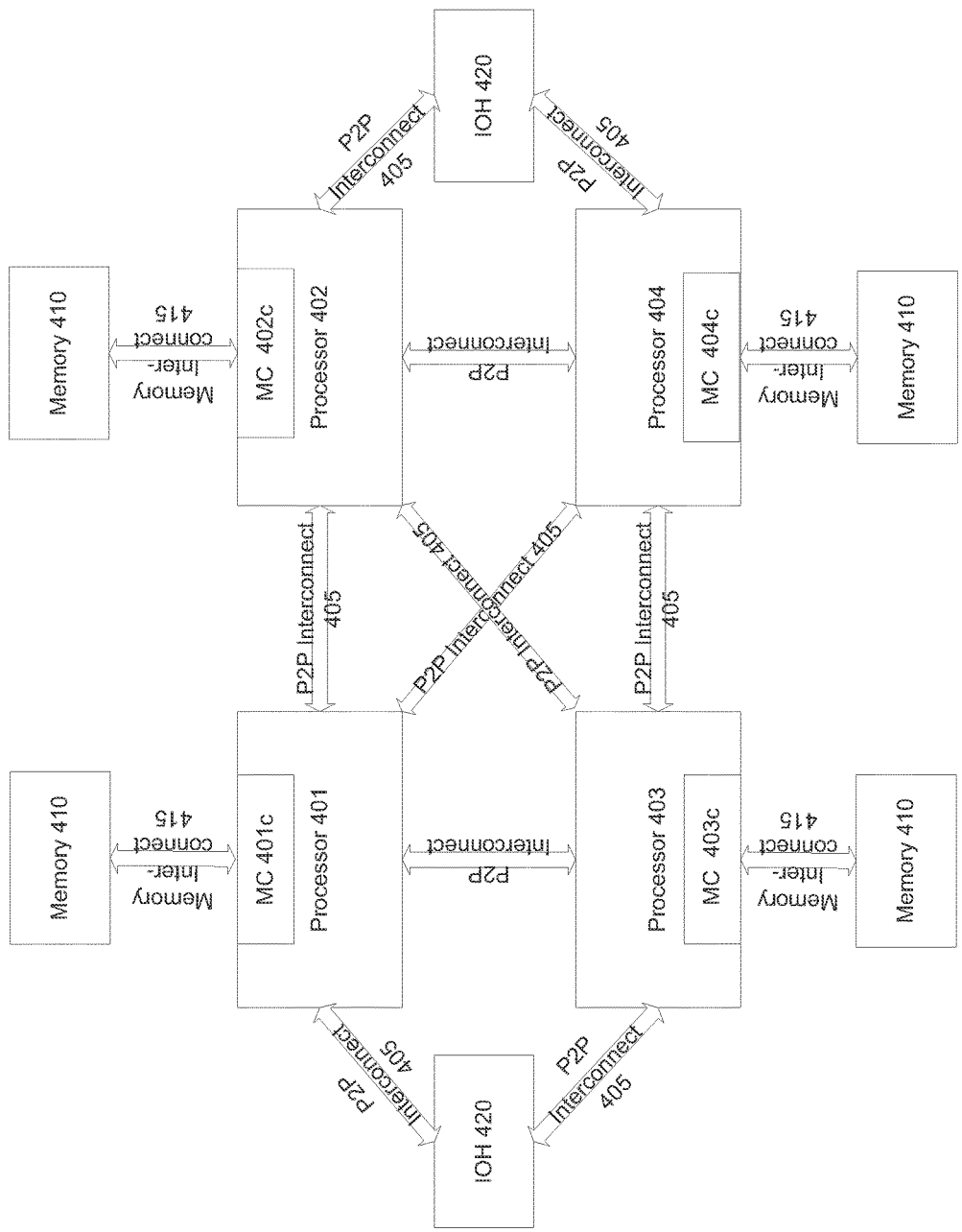
FIG. 4 illustrates another embodiment of a logical representation of a computer system configuration.

Referring to FIGS. 2-4, embodiments of a computer system configuration adapted to include processors to balance performance and power between processing element/cores on integrated circuits is illustrated. In reference to FIG. 2, an illustrative example of a two processor system 200 with an integrated memory controller and Input/Output (I/O) controller in each processor 205, 210 is illustrated. Note that processors 205, 210 each may include integrated graphics processors/cores, as discussed above. Although not discussed in detail to avoid obscuring the discussion, platform 200 illustrates multiple interconnects to transfer information between components. For example, point-to-point (P2P) interconnect 215, in one embodiment, includes a serial P2P, bi-directional, cache-coherent bus with a layered protocol architecture that enables high-speed data transfer. Moreover, a commonly known interface (Peripheral Component Interconnect Express, PCIE) or variant thereof is utilized for interface 240 between I/O devices 245, 250. However, any known interconnect or interface may be utilized to communicate to or within domains of a computing system.

Turning to FIG. 3 a quad processor platform 300 is illustrated. As in FIG. 2, processors 301-304 are coupled to each other through a high-speed P2P interconnect 305. And processors 301-304 include integrated controllers 301c-304c. FIG. 4 depicts another quad core processor platform 400 with a different configuration. Here, instead of utilizing an on-processor I/O controller to communicate with I/O devices over an I/O interface, such as a PCI-E interface, the P2P interconnect is utilized to couple the processors and I/O controller hubs 420. Hubs 420 then in turn communicate with I/O devices over a PCIE-like interface.

Figure 5:
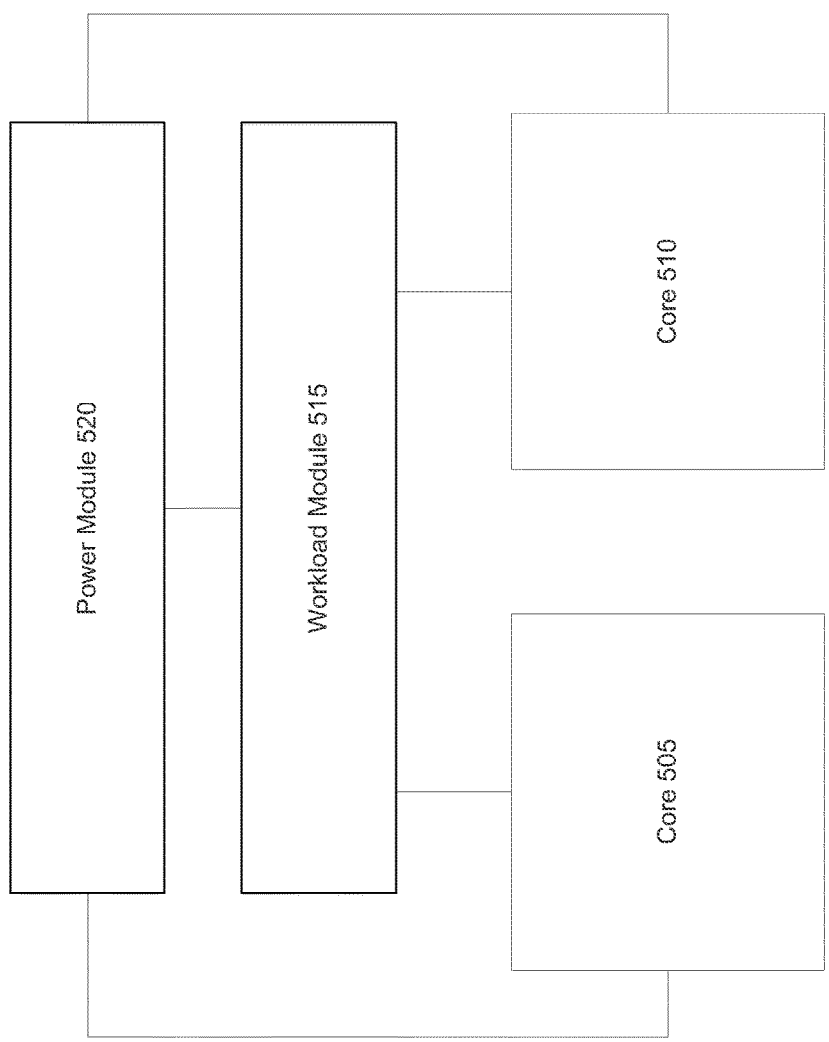
FIG. 5 illustrates an embodiment of a logical representation of an integrated circuit to balancing power among processing elements to achieve maximum overall performance.

Referring next to FIG. 5, an embodiment of a logical representation of modules to balance power between multiple processing elements to achieve maximum performance is depicted. Although only two cores are illustrated in FIG. 5, any type of processing element and number thereof may be utilized. For example, in the most commonly discussed scenario herein (a CPU and GPU), both the CPU and GPU potentially includes multiple cores. And as a result, workload determination (which is described in more detail below) may be in reference to individual cores or groupings of cores, such as a workload in regard to all CPU cores in comparison to all GPU cores.

However, to further the discussion in regards to FIG. 5, core 505 is referred to below as a CPU core (or collection of CPU cores), while core 510 is referred to as a GPU core (or collection of GPU cores). It is also worth noting that although the discussion herein primarily focuses on power balancing between asymmetric cores; such balancing, in one embodiment, is also utilized between cores of the same type. For example, assume cores 505 and 510 are both CPU cores and are executing related threads (e.g. producer and consumer related threads, such as a main thread of a single application executing on core 505 and a run-ahead helper thread for the single application execution on core 510, where the run-ahead helper thread produces information to be consumed by the main thread). Consequently, power/frequency balancing may be performed to achieve maximum performance between the threads (e.g. if core 510 executing the helper thread is running too far ahead, such as acquiring too many future locks or prefetching too much information, then core 510's frequency is decreased, while core 505's frequency is increased to consume at a higher rate and catch up with the prefetching of core 510).

Continuing the discussion of FIG. 5, workload module 515 is to determine a workload of core 505, core 510, or both. Determining a workload includes any known method for determining activity of hardware, a workload of software, a number of instructions executed or to execute, or any other metric for determining use of a processing element. As one example, a workload for core 505 includes an amount time core 505 is active during a period of time. Activity may be determined as when core 505 is in an active performance state versus a sleep or low power state or a number of cycles executing or performing operations.

As a corollary to the multitude of potential workload measurements, the components to measure such workload may also vary. To further discussion of the potential components for workload measurement, it's assumed below that workload is measured as a number of active cycles over a period of time (i.e. a total number of cycles for measurement). As a first example, a hardware register, counter, and/or accumulator associated with each of cores 505, 510 track active cycles. And upon expiration of a period of measurement, the number of active cycles is determined for the period. As another example, a microcontroller executes code that causes hardware to track active cycles over a period. Moreover, microcode, privileged-level code, application code, or other code may be executed to similarly cause hardware to track active cycles over the period of measurement.

In one embodiment, power module 520 is to dynamically balance performance between cores 505, 510 based on workload determination from workload module 515. Balancing 'performance' between cores includes modifying any metric or factor that affects core performance and/or power. For example, if separate power delivery is provided for CPU core 505 from GPU core 510, then the power delivery or limits thereof may be altered to balance performance there between. However, often when CPU core 505 and GPU core 510 are included on the same package, power delivery is not separate. Therefore, as another example frequency between the individual cores is balanced. In this scenario, power module 520 is to dynamically tune frequency allocation between core 505 and core 510 based on a power limit for an integrated circuit or package including cores 505,510 and one or more workloads as determined by workload module 515. Note that frequency may not be directly altered in some embodiments, but rather an underlying metric, such as current, is altered to affect the change in frequency.

As one example, power module 520 is to increase frequency for core 505 and/or decrease frequency for core 510 in response to the dynamically determined workload for core 505 being greater the workload for core 510. Here, if one core is demonstrating a greater need of performance due to a higher workload, then its frequency is increased. And when an integrated circuit including cores 505 and 510 are up against a power limit, then the core demonstrating less need for performance requirements is decreased in frequency to counterbalance/compensate for the increase in frequency to the other core. In another example, power module 520 is to increase frequency for core 505 and/or decrease frequency for core 510 in response to determining core 505 is a performance bottleneck. In other words, core 505 is limiting overall performance, because core 510 is relying on output from core 505 to continue further execution. But core 505 is operating to slowly. Then, core 505's frequency is increased to ensure overall performance is accelerated. Yet again, if a power limit is encountered, then core 510's frequency may be similarly decreased to ensure the power limit is enforced. Note that in some embodiment, hysteresis may be utilized to avoid a 'see-saw' effect, where power/performance balance bounces between settings. For example, CPU frequency is raised quickly (e.g. upon first detection of requiring more performance/frequency), while reduction of frequency from lack of demand is determined over multiple consecutive (or non-consecutive but closely related) periods of measurement.

In one embodiment, a basic assumption of potential bottlenecks allows the process to be simplified. For example, assume core 505 is a collection of CPU cores and core 510 is a collection of GPU cores. Here, as an exemplary base assumption, it's assumed that when GPU cores 510 are operating at a maximum (i.e. fully occupied), then GPU cores 510 are the performance bottleneck (i.e. GPU is working as fast as it can under the current limits, but it's not completing the work fast enough). As a result of the assumption, if GPU cores 510 are operating over a workload/activity threshold, it's considered to be a bottleneck. So, the frequency of the GPU is increased. And if a power limit is reached, the CPU frequency is capped (or decreased) to ensure the power limit is upheld. However, if workload module 520 determines the GPU 505's frequency is below a threshold (i.e. not working/consume at maximum capacity), then any CPU 505's frequency cap or limit is increased to cause more production, such that GPU cores 510 workload increases accordingly.

Any hardware, firmware, microcode, software, or combination thereof may perform the balancing, tuning, and/or allocating described above. As one example, the balancing policies are implemented in a Power Control Unit (PCU), which often includes a microcontroller configured to execute collocated power code. Here, the power code, when executed by the microcontroller, loads workload information from workload module 515, determines an appropriate balancing action (e.g. increasing frequency of cores 510), and initiates the balancing action (e.g. indicates the frequency increase, enabling hardware/logic to actually increase the frequency). As another example, code and hardware are both utilized for balancing. In one scenario, a graphics driver for GPU cores 510 loads the graphics workload information from workload module 520 (e.g. hardware activity tracking logic). And either the device driver, a privileged level power service routine (e.g. OS service routine), or other code/hardware determines if a balancing action is to be taken at least based on the graphics workload information. Additionally, CPU core 505 workload information may also be taken into account to determine the appropriate balancing action.

In one embodiment, the balancing decision maker also takes into account a software hint to determine how performance/power is to be balanced among processing elements. For example, GPU cores 510 workload information is determined, as discussed above. And an executing application provides a software hint of whether a future workload (i.e. a portion of the application) is to include a larger or smaller graphics workload in comparison to a previous portion of the application that resulted in the measured workload. Here, if the GPU is close to a threshold (or close to fully occupied) and the applicant hints that a next period is associated with a greater graphics workload, then the power module 520 may determine that GPU frequency is to be increased and CPU frequency is to be capped; even if the previous activity has not reached an activity threshold. As a result, the hint aids in predicting future activity; instead of relying purely on previous, measured workload information. Note that a hint may be provided through an Instruction Set Architecture defining such a hint, an Application Program Interface (API), or other known structure/method for communicating information from software to hardware.

Figure 6:
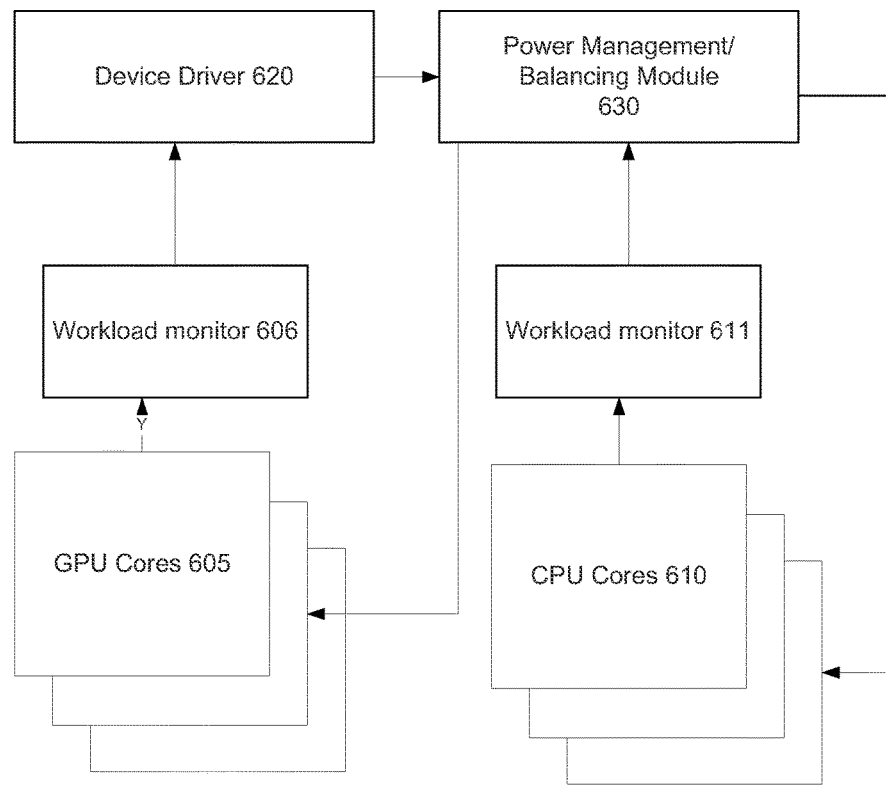
FIG. 6 illustrates another embodiment of a logical representation of an integrated circuit to balancing power among processing elements to achieve maximum overall performance.

Turning to FIG. 6, another embodiment of a logical representation of modules to balance power among processing devices to achieve maximum overall performance is illustrated. In one embodiment, Graphics Processing Unit (GPU) cores 605 and Central Processing Unit (CPU) cores 610 are on the same die, integrated circuit, package, or other grouping, which may be subject to an overall power or performance limit. For example, a thermal design power (TDP) power limit is often provided for an integrated circuit or package. In other words, a power limit is provided for a maximum thermal dissipation capacity of the integrated circuit. However, in another embodiment, GPU cores 605 and CPU cores 610 are separate integrated circuits to be inserted in a single platform, which may similarly be subject to an overall platform power and/or thermal limit.

Workload monitor 606 is illustrated as associated with GPU cores 605, and workload monitor 611 is illustrated as associated with CPU cores 610. As stated above, workload monitor 606 and 611 may be implemented in hardware associated with GPU cores 605 and CPU cores 610, workload code to be executed by a micro-controller, and/or code (e.g. micro-code, driver code, other code) executed on GPU Cores 605 and/or CPU cores 610.

Device driver 620, which may be executing on CPU cores 610, is to read/load workload information from workload monitor 606. For example, a number of cycles GPU cores 605 are active is held in a register, counter, and/or accumulator in GPU 605. Device driver 620 loads the count every period and determines GPU 605 activity. Here, in one embodiment, device driver 620 makes the balancing decision based on the graphics activity from workload monitor 606. In one scenario, if the workload activity is greater than a threshold, then driver 620 indicates that GPU cores 605 are occupied (i.e. a fully active and may be a bottleneck). In this embodiment, power management/balancing module 630 (hardware, firmware, code, or a combination thereof) receives the occupied indication and performs the appropriate balancing action (e.g. capping CPU cores 610 frequency and/or increasing GPU core frequency 605). As specific illustrative examples, power module 630 includes a PCU, power code, microcode, application code, privileged level code, an Operating System (OS) power management service, etc.

In another embodiment, power management module 630 (e.g. such as a privileged power management service) loads CPU activity information from monitor(s) 611. And with GPU cores 605 activity information either directly from workload monitor 606 or device driver 620, power management module 630 makes the balancing decision. And module 630 also either directly implements the balancing decision or indicates that the balancing is to be performed by some other module, unit, or entity.

As one example, power management module 630, which in some embodiments encompasses device driver 620, sets a performance limit for one or more of the CPU cores 610 and/or GPU cores 605. Here, assume that an overall power or thermal limit for GPU cores 605 and CPU cores 610 has been reached. And during workload measurement, it's determined that GPU cores 605 activity exceeds an occupied threshold. As an illustrative example of a threshold, a number of cycles to consider a GPU occupied may range from over 50% of cycles in a period active to 100% of cycles in a period active. For example, assume the activity threshold is 95% activity, then if workload monitor 606 detects 96%-100% active cycles, then it's determined the activity threshold is exceeded.

As a result, a performance limit (e.g. a maximum operating frequency for CPU cores 610, a maximum turbo frequency for CPU cores 610, a maximum current for CPU cores 610, and a maximum energy consumption for CPU cores 610) is set. This action alone may be enough to balance the production of CPU cores 610 to match the consumption rate of GPU 605. However, in another embodiment, a performance metric for GPU cores 605, which may be the same performance metric limited for CPU cores 610 or a different performance metric, is increased. Here, the increase for GPU 605 is intelligently selected to balance with CPU cores 610's increase, such that the power or thermal limit that has already been encountered is not exceeded. Inversely, if the GPU workload is below a threshold and a cap/limit has been placed on CPU cores 610 from a previous period, then that cap is either increased or removed. Essentially, if GPU cores 605 is being underutilized, it's assumed that CPU 610 is not producing at a fast enough rate to fully utilize GPU 605. Therefore, CPU 610 is increased or allowed to run-to-completion to generate more work for GPU cores 605. Also much like the discussion above, if a power limit is reached, then GPU 605's performance metric, such as frequency, may be reduced, since it doesn't need full performance to complete its workload that was below an activity threshold.

As can be seen from above, the power consumption that has reached a limit is intelligently redistributed among processing elements to achieve an optimal balance that provides the best overall performance. In contrast, if power wasn't balanced as discussed herein, then the power limit is enforced but one of the processing elements may act as a performance bottleneck that limits overall performance. In contrast, such intelligent redistribution enables bottlenecks to be alleviated, even under power constraints, which enables maximum performance under the most efficient energy consumption constraints.

Figure 7:
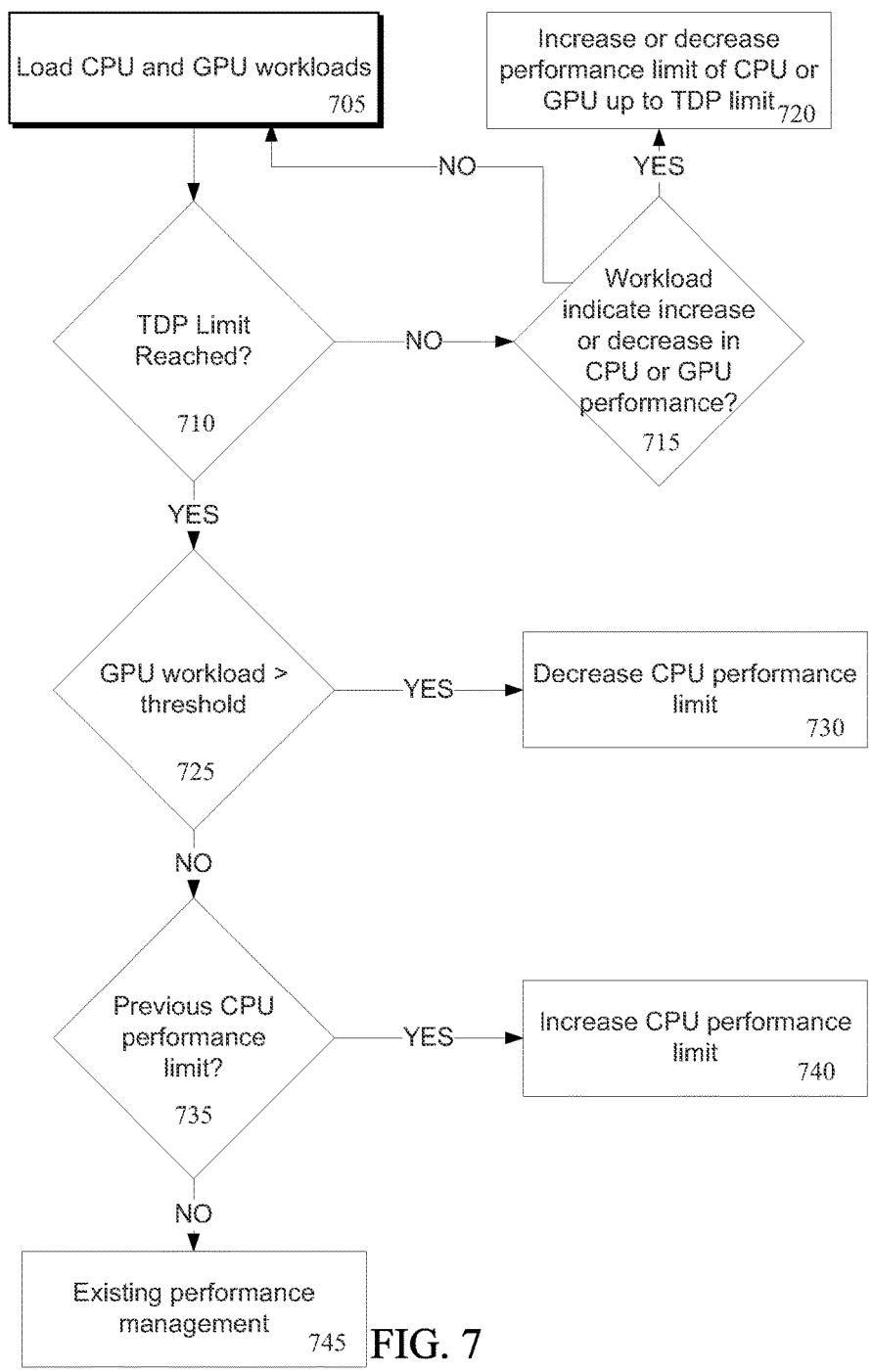
FIG. 7 illustrates an embodiment of a flow diagram for balancing power between a processor and graphics processor to achieve maximum performance within a power limit.

Moving to FIG. 7, an embodiment of modules and/or a representation of a flow diagram for balancing power between a processor and graphics processor to achieve maximum performance within a power limit is depicted. Note that the flows (or modules) are illustrated in a substantially serial fashion. However, both the serial nature of these flows, as well as the depicted order, is not required. Also, flows are illustrated in a substantially linear. However, the flows may be performed in parallel over the same time period. In addition, any of the illustrated flows or logical blocks may be performed within hardware, software, firmware, or a combination thereof. As stated above and below, each flow, in one embodiment, represents a module, portion of a module, or overlap of modules. Moreover, any program code in the form of one or more instructions or operations, when executed, may cause a machine to perform the flows illustrated and described below. For example, in one embodiment, program code includes a device driver, such as a graphics driver; a privileged service routine, a portion of power code for a Power Control Unit, a portion of microcode for a processor, or a combination thereof.

In flow 705, a graphics processor and or central processor workload over a period of time is received (or loaded) from one or more workload monitors. As one example, an activity count is read/loaded from a hardware register in the devices. Yet, any known method of tracking workload or activity over a period of time may be utilized.

Then in flow 710, it's determined if a limit, such as a thermal design power (TDP) limit, is reached. Although any power or energy limit may be encountered, often a power limit based on electrical and thermal limits for a package including the GPU and CPU (i.e. TDP limit for the package) is utilized. If the power limit has not been reached and either the CPU or GPU workload indicates an increase in performance is needed (flow 715), then the power or performance metric, such as frequency, is increased up to a maximum allowable to accommodate the workload in flow 720. Here, if there is no concern of hitting a power limit, then a potential bottleneck is eliminated through purely providing more performance. In contrast, if no performance increase is needed, as indicated by the workloads from flow 705, then the flow resets to measure workload and read once again in flow 705 after a subsequent period. Note that in flow 715 it may instead be determined that performance of a device, such as a GPU, may be lowered and the GPU would still be able to accommodate the measured workload. As a result, GPU performance is reduced, which in turn decreases power consumption, while maintaining workload performance.

However, if a limit has been encountered, then the power and/or performance is balanced to alleviate as much of a bottleneck as possible. Therefore, in flow 725 it's determined if the loaded GPU workload is greater than a workload/activity threshold. If the GPU workload is above the threshold, then in flow 730 a performance limit is imposed on the CPU. In other words, the GPU is being overworked and the CPU's production is capped. As can be seen, one way to alleviate the GPUs workload is to cap CPU production. However, to further alleviate the bottleneck, GPU performance, such as frequency is increased. Because of the increase in GPU frequency, the GPU power consumption is increased. And without the decrease or capping of CPU frequency, which results in lower CPU power consumption, the encountered TDP limit would be exceeded. However, the balancing of capping CPU performance and the similar increase in GPU frequency ensures the TDP limits are not exceeded. But instead, the available power is intelligently redistributed among the GPU and CPU to obtain the best performance based on actual, measured GPU workload.

Yet, if the GPU workload is not greater than a threshold, then in flow 735 its determined if a previous CPU limit has been imposed. If no limit has been imposed, then the CPU continues to operate according to existing polices in flow 745. However, if the GPU is below an activity threshold and the CPU has a current performance limit, then the limit is increased and/or removed in flow 740. As discussed above, in this scenario the GPU is not working hard, so the production of the CPU is increased. Consequently, if no CPU cap is in place, the low graphics activity may be due to an application that is not graphics intensive. In contrast, if a CPU performance limit has been imposed, then it is increased to potentially also increase the CPU's production for the GPU.

Figure 8:
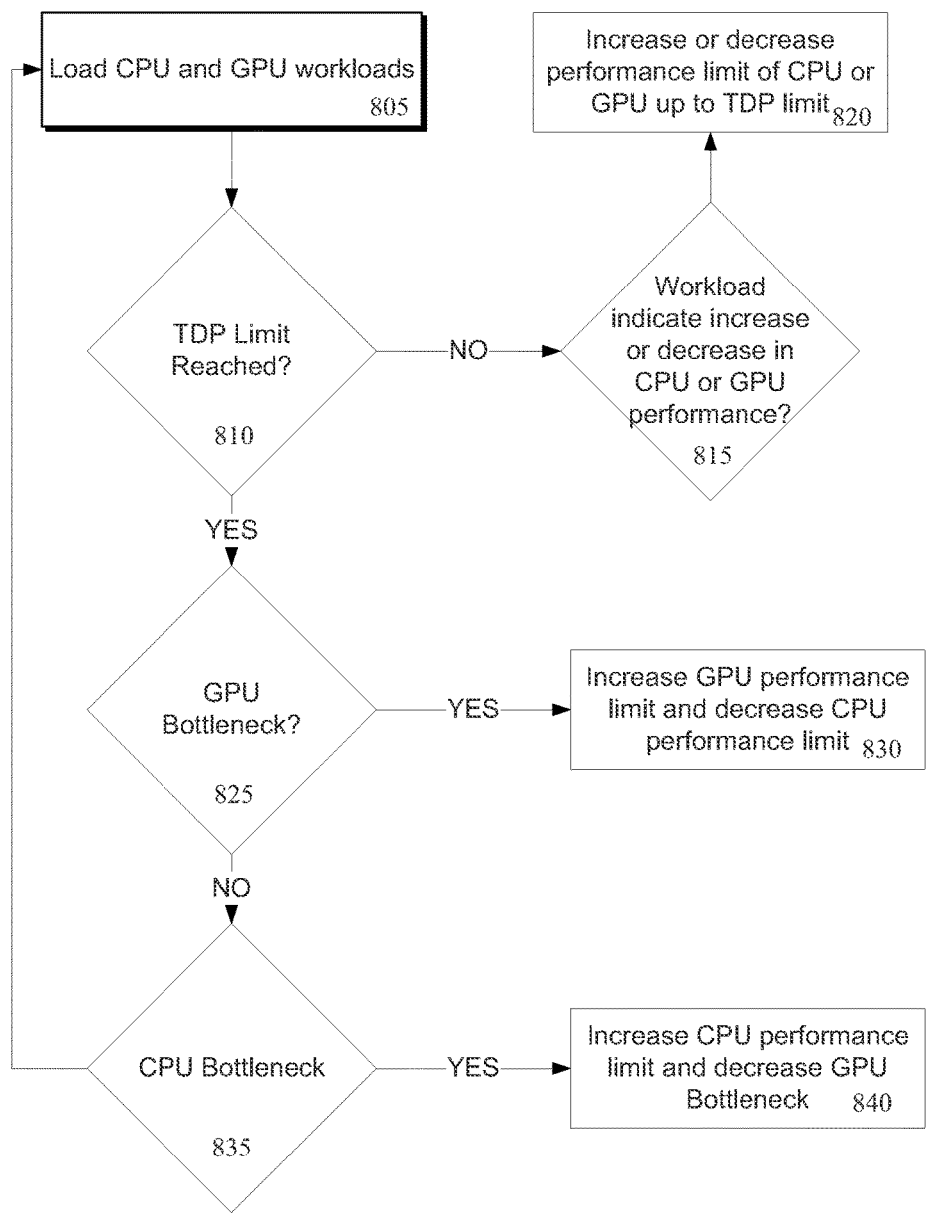
FIG. 8 illustrates another embodiment of a flow diagram for balancing power between a processor and graphics processor to achieve maximum performance within a power limit.

Referring to FIG. 8, another embodiment of modules and/or a representation of a flow diagram for balancing power between a processor and graphics processor to achieve maximum performance within a power limit is depicted. Similar to FIG. 7 and flow 705, a processing workload activity for a central processor and a graphics workload activity for a graphics processor is determined. And in flow 810, as in flow 710, it's determined if a platform, package, integrated circuit, or other form holding the central processor and graphics processor has reached a power limit, a thermal limit, or combination thereof (e.g. a TDP limit).

In flow 825, it's determined if the graphics processor is a performance bottleneck based at least on the graphics workload activity determined in flow 805. As one example, such a determination is based on whether the graphics workload activity is greater than a graphics activity threshold. Here, if the activity is greater than a threshold it's assumed that the GPU is a bottleneck. However, if the activity is less than the threshold, then it's assumed for flow 825 that the CPU is the bottle neck. However, such comparisons of activity to a threshold are not required. For example, workloads may be directly compared. And if one is higher than the other, it is determined to be the bottleneck.

Therefore, in flow 830, a processor performance limit for the central processor is set below a previous processor performance limit in response to determining the graphics processor is the performance bottleneck in flow 825. Or in flow 840, a graphics performance limit for the graphics processor is set below a previous graphics processor performance limit in response to determining the central processor is the performance bottleneck in flow 835. And similar to the discussion above, the competing device may be increased to further alleviate any bottleneck.

Although the discussion has primarily focused on competing devices being central processors and graphics processors, any devices that have a producer-consumer relationship, contend for power or performance resources, or are regulated under an overall power or thermal limit may similarly have power/performance balanced between them. Therefore, available power is intelligently allocated between devices to provide the best possible performance from an overall perspective, instead of each individual component being charged with its own power and performance regulation without being cognizant of their application level contribution or monopolization of resources.

Figure 9:
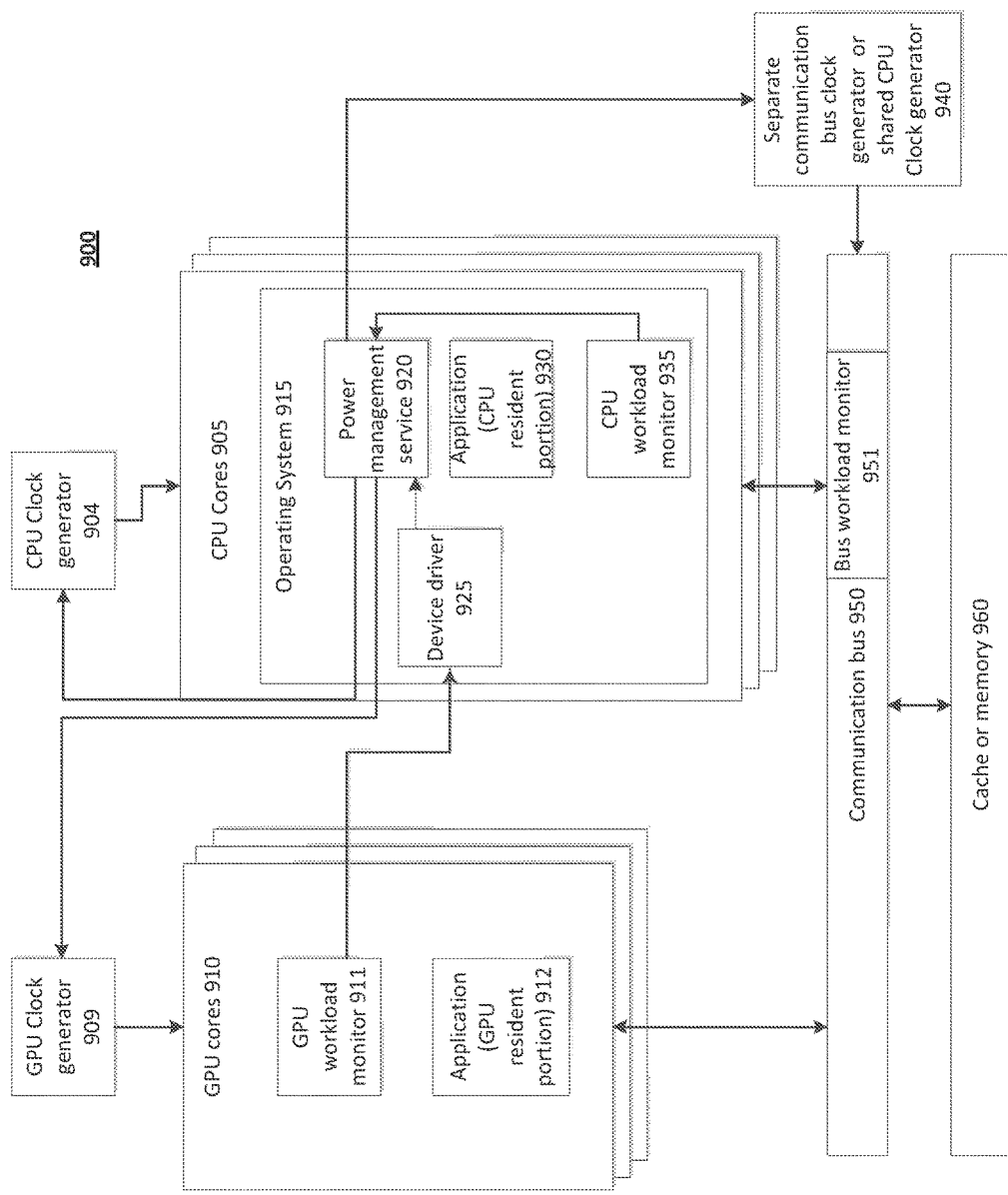
FIG. 9 illustrates an embodiment of a logical representation of an block diagram for units/modules to balancing power among processing elements and/or a communication bus to achieve maximum overall performance.

Turning next to FIG. 9, an embodiment of a logical representation of units, modules, and/or software entities to dynamically balance power between multiple units/devices, such as CPU cores, GPU cores, and communication interfaces, is illustrated. The apparatus and methodology of balancing power/performance above has been in regard to a producer consumer relationship (e.g. one device producing for another, such as a CPU and GPU). One specific example of such a relationship also includes a core, such as a CPU and/or GPU, and a communication bus/memory. Here, a core often produces for a communication bus (i.e. a core generates requests that are transmitted by a communication bus). Therefore, just as a CPU, GPU, or other core may be a bottleneck to performance (even under a power limit), so might a communication bus. Therefore, in one embodiment, power (e.g. current, voltage, frequency, or other metric affecting power consumption) is balanced between one or more cores and a communication bus.

This communication bus scenario is discussed in more detail below, but may be applied in a more broad sense. In fact, in a phone or tablet space, the power balancing methodologies described herein may utilized between other units. For example, a radio or network interface may be dynamically balanced under a limit with cores or other interconnects. As a specific illustrative example, power of a radio may be reduced to save power if the network is not a bottleneck and the power may be allocated to a core or other interconnect. And inversely, if the radio transceiver is a bottleneck, then a core or other interconnect frequency may be reduced to free up power to be allocated to the radio for obtaining more bandwidth. As can be seen from this example, such dynamic power allocation at a limit may be utilized between any functional units of a device, from a traditional processor to a SOC, phone, embedded, or other device/system.

Communication bus 950 includes any known bus or interconnect. In one scenario, bus interface 950 is to communicate with devices external to processor 100, such as system memory, a chipset (often including a memory controller hub to connect to memory and an I/O controller hub to connect peripheral devices), a memory controller hub, a northbridge, or other integrated circuit. And in this scenario, bus 950 may include any known type of interconnect, such as multi-drop bus, a point-to-point interconnect, a serial interconnect, a parallel bus, a coherent (e.g. cache coherent) bus, a layered protocol architecture, a differential bus, and a GTL bus. In another embodiment, communication bus 950 is to communicate with devices integrated on the same package or die as cores 905, 910, such as a memory controller hub, a graphics processor/device, and/or a cache memory. In this case, a portion of the processor (an on-core portion) includes one or more controller(s) for interfacing with other devices such as a memory and/or a graphics device. The configuration including an interconnect and controllers for interfacing with such devices is often referred to as an on-core (or un-core configuration).

As the illustrative example depicts, bus 950 includes a ring interconnect topology to connect GPU cores 910, CPU cores 905, and a cache memory 960 (e.g. a last level cache, a level-two cache, a level three cache, or other known cache memory). However, such a ring interconnect may include any other known devices, as well as excluding or replacing illustrated devices (e.g. a memory controller instead of a cache memory 960). Here, graphics cores 910 may even have direct access to cache 960 through ring interconnect 950. Yet, in the SOC environment, even more devices, such as the network interface, co-processors, memory, I/O devices, and any other known computer devices/interface may be integrated on a single die or integrated circuit to provide small form factor with high functionality and low power consumption. And as discussed in more detail below, when power policies are developed for the entire IC, the techniques for power balancing between prominent, integrated devices become even more important.

In one embodiment, power management service 920 is to dynamically balance power, which may be in the form of voltage, current, frequency, clock, or other known processor power changing knob, between cores (e.g. 910 and/or 905) as well as communication bus 950. With specific reference to FIG. 9, GPU cores 910 are associated with a workload monitor 911 to determine GPU workload, while CPU cores 905 are associated with CPU workload monitor 935 to determine CPU workload. Additionally, communication bus 950 is associated with a workload monitor 951. As mentioned above, determining a workload includes any known method for determining activity of hardware, a workload of software, a number of instructions executed or to execute, or any other metric for determining use of a processing element. As one example, a workload for cores 905 includes an amount time cores 905 are active during a period of time. Activity may be determined as when cores 905 is in an active performance state versus a sleep or low power state or a number of cycles executing or performing operations. Alternatively, activity may be measured in a number of active cycles (i.e. the number of cycles in a period that CPU cores 905 are fetching, decoding, issuing, executing, and/or retiring instructions). In a similar manner, workload monitor 951 determines activity of communication bus (i.e. number of cycles or number of work slots occupied by activity on bus 950). For example, if the bus is able to handle a request or work slot per cycle, then activity in this case may be measured by how many work slots are occupied by activity of a period or time frame of total work slots. As a specific example, a counter counts a number of slots or entries that are issued over cycles (i.e. if the queue is empty during any of the cycles or no entry/request is issued during a cycle).

As a corollary to the multitude of potential workload measurements, the components to measure such workload may also vary. To further discussion of the potential components for workload measurement, it's assumed below that workload is measured as a number of active cycles over a period of time (i.e. a total number of cycles for measurement). As a first example, a hardware register, counter, and/or accumulator associated tracks active cycles or occupied work slots. And upon expiration of a period of measurement, the number of active cycles is determined for the period. As another example, a microcontroller executes code that causes hardware to track active cycles over a period. Moreover, microcode, privileged-level code, application code, or other code may be executed to similarly cause hardware to track active cycles over the period of measurement.

Once the workloads are determined, then power is balanced among the selected devices (e.g. cores 910, cores 905, and bus 960) based on those measured workloads. As aforementioned, such a determination of how to balance power may be made by hardware (i.e. logic in the device, such as a power control unit), firmware (i.e. microcode or collocated code to be executed by cores or a control unit with a microcontroller), and/or software (e.g. power management service 920 that is part of operating system 915, user-level code, device driver code 925, or other code). The discussion below will primarily focus on power management service routine 920; however, it's important to note that the discussion similarly applies to application in hardware, firmware, or other software code.

Here, if communication bus 950 is too busy (i.e. the workload is too high, such as over a threshold), then any executing application slows down based on the communication bottleneck between cores 905, cores 910, and cache memory 960. Therefore, in one embodiment, in response to encountering such a situation, the communication bus frequency/power is increased (i.e. a clock generator 940 for communication bus 950 is accelerated/stepped-up). However, as encountered above, if integrated circuit 900 is operating at a maximum (e.g. power or thermal limit), then the increase in communication bus frequency 960 is counterbalanced in the CPU and/or GPU.

In this case, any number of balancing effects may be utilized. For example, both CPU cores 905 and GPU cores 910 may be capped (i.e. decreased limit in power/frequency) to decrease the load on communication bus 950. However, a more intelligent balancing methodology may be utilized instead. In this scenario, caps may be dynamically and separately altered for each component or unit. As an illustrative example, assume that communication bus 960 is operating at 100% workload (i.e. all work slots in a given time period were occupied as measured by workload monitor 951), GPU cores 910 are operating at a 97% workload activity, and CPU cores 905 are operating at a 80% workload activity. As can be seen from this example, the biggest bottleneck in the system is the communication bus 950, as it's fully occupied. But GPU cores 910 also have a high workload activity in comparison to CPU cores 910. As a result, if IC 900 is up against a power, thermal, or other limit, CPU cores 905 may be capped or limited the most (i.e. frequency and/or power is capped), while power to GPU cores 910 are slightly capped, maintained, or actually increased. And communication bus 950 is allocated even more power. Therefore, a power increase for communication bus 950 (and potentially for GPU cores 910) is dynamically balanced with a cap of CPU cores 905 (and potentially GPU cores 910) to alleviate the bottlenecks in the system to increase performance, while not exceeding the current limit for IC 900.

As can be seen, any methodology for dynamically allocating power between units/cores may be utilized to stay under a limit and maximize performance. In fact, in some implementations increasing a bus in frequency results in less extra power consumption than the same reduction in frequency for cores 905. For example, assume a one-step increase in frequency for communication bus 950 results in a 1 watt power increase. But if IC 900 is at a power limit, then CPU cores 905 may be capped. Yet, a one-step decrease in frequency in CPU cores 905 may result in a 2 watt drop in power. As a result, if CPU cores 905 are simply increase one frequency stepping, while bus 950 is decreased by one frequency stepping, then additional power is left under the limit for extra performance. Consequently, in one embodiment, other actions (e.g. a simultaneous increase in frequency for GPU cores 910 or a2.times.stepping for bus 950) may be performed to ensure a limit is not exceeded, but that performance/power is not left on the table.

Furthermore, in another embodiment, power planes (or clocking domains) of different cores/units may be tied together. As a result, a dynamic power balancing methodology, in some implementations, should take that into account. For example, in some embodiments, clock generators 940 and 904 are shared between CPU cores 904 and communication bus 950. As a result, a stepping in frequency for communication bus 950 includes a similar stepping for CPU cores 905. Therefore, a step in the consumer frequency may actually cause one of the producers (CPU cores 905) to increase production. As a result, the balancing algorithm takes such a tying into account, so GPU cores 909 may be reduced to balance the effect from bus 950 and CPU cores 905 being increased.

In another embodiment, a lower limit may be provided for one or more of the devices, cores, and/or units. For example, assume a game is executing on IC 900. Here, GPU cores 910 are have a 100% workload, even when processor 904 and communication bus 950 are operating at a very low workload. In fact, CPU cores 905 and communication bus 950 may be reduced dramatically to bare operation to give GPU cores 910 all the possible power/frequency for maximum performance. But if communication bus 950 is reduced too low (i.e. the frequency is very low), then a request made to cache 960 takes a long time to complete due to the low frequency. And GPU cores 910 may start to stall and wait on information to return. Essentially, the GPU is the primary produces, and the most power is allocated there. But when the GPU is to consume from communication bus 950, the bus frequency can't be too low that it slows overall performance. Therefore, in one embodiment, a lower limit is provided for communication bus 950. For example, a frequency level (e.g. between 400 Mhz to multiple GHz) is imposed. So in this scenario, communication bus 950 is capped and reduced to provide as much power to the bottleneck (GPU cores 910) as possible until it reaches the low frequency limit. At that point, the balancing algorithm (e.g. power management service 920) doesn't reduce communication bus frequency 950 any further to avoid adversely affecting overall performance. As a result, the advantage of obtaining maximum performance at a high limit for IC 900 is maintained by utilizing a low limit for units or cores in conjunction with the power balancing.

Figure 10:
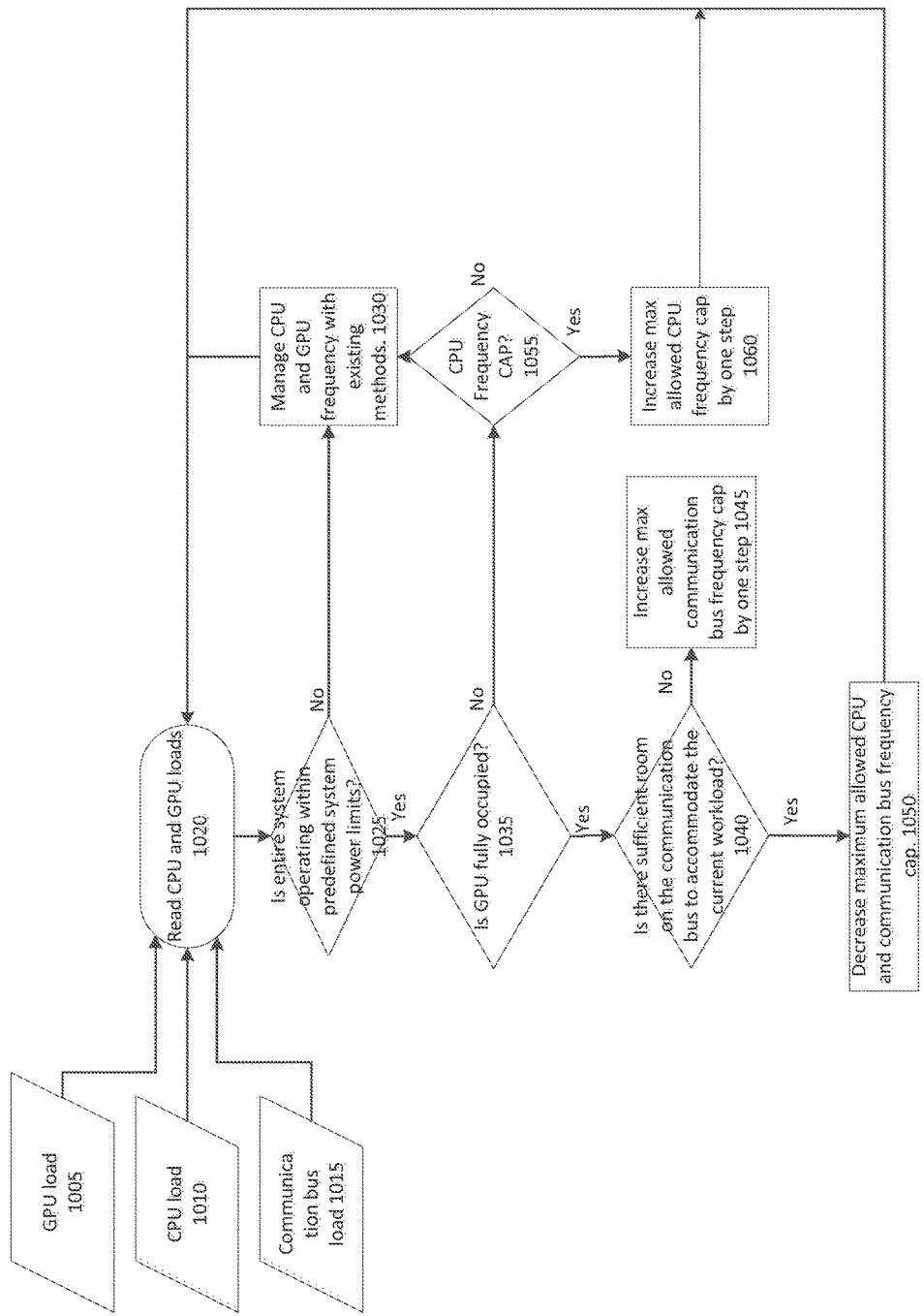
FIG. 10 illustrates an embodiment of a flow diagram for balancing power between a processor, a graphics processor, and/or a communication bus to achieve maximum performance within a power limit.

Referring next to FIG. 10, an embodiment of a flow diagram for a method of balancing power between cores and a communication bus is illustrated. Note that the discussion below is often in reference to a power management routine (such as the routine 920 of FIG. 9) making such decisions; however, similar flows and operating may be performed in hardware, software, firmware, or a combination thereof. Additionally, the flow assumes a primary graphics bottleneck that is evaluated first in flow 1035 before a communication bus workload or CPU workload. Yet, in other embodiment, any workload may be determined first. Moreover, power balancing is not limited to CPU cores, GPU cores, or communication interfaces, but rather it may be extended to other interfaces, units, or logic.

In flows 1005, 1010, and 1015 workloads of elements of interest are determined. For example, workload monitor 911 determines a GPU workload and provides it to device driver 925 that provides it to power management service 920 in OS 915, workload monitor 935 provides a CPU workload to service 920, and workload monitor 951 provides interconnect workload to service 920. Note that such providing may done by reading from the workload monitors in flow 1020 (e.g. device driver 925 loads the GPU workload from monitor 911, while service 920 loads from CPU monitor 935 and bus monitor 951).

In flow 1025, the power service routine 920 (or other hardware, firmware, software, or combination in other embodiments) determines if IC 900 is operating within limits. For example, IC 900 may have a TDP limit. And a PCU determines if IC 900 has reached a thermal, power, or other limit. If IC 900 is not operating at or above a limit, then existing methodologies, such as race to finish methodologies (i.e. increase power to one or more elements to improve performance) are utilized. However, if IC 900 is at a limit, then the power/frequency is balanced at that limit between the elements.

As an illustrative example of a potential algorithm, the power service routine 920 determines if the GPU is fully occupied. For example, service 920 compares the workload from monitor 911 to a threshold. And if the workload exceeds the threshold, then service 920 determines GPU cores 910 are fully occupied. Note that in one embodiment, such threshold may be 99% or 100%. In this scenario, GPU cores 910 are considered fully occupied if they are 100% active. However, any threshold level may be utilized. If not above the threshold (i.e. not fully occupied, then routine 920 determines if there is a cap of frequency for CPU cores 905 (i.e. a cap previously imposed by service 920) in flow 1055. If not, then previous methodologies are utilized in flow 1030. However, if there is a CPU cap, then the Cap is increased by one step in flow 1060, since the GPU is not fully occupied (i.e. the consumer in this scenario is not full, so we are able to increase the producer).

Yet, if the GPU is fully occupied in flow 1035, then in flow 1040 service 920 determines if there is sufficient room on the communication bus to accommodate the current workload 1040. Similar to above, this flow may include a threshold comparison. As an example, if communication bus is above a workload threshold, then it is considered fully occupied (i.e. there is not sufficient room). Here, there is not enough available work slots, then the communication bus frequency cap is increased by a step in flow 1045 to accommodate more work by potentially increasing GPU frequency due to it being fully occupied, as determined in flow 1035. Or if it's below the threshold, then it has room (i.e. available work slots) for more work, so the communication bus and/or CPU frequency may be capped in flow 1050 to balance the potential increase of GPU frequency from determining it's fully occupied in flow 1035. Note that discussion of increasing a GPU frequency is included. However, in some embodiments, a GPU is already at a maximum frequency. So capping of bus frequency and CPU frequency is to free up (save) power, when the GPU is the bottleneck. In other words, the CPU and communication bus don't have to operate so fast when they are waiting on the GPU anyways. Here, that allocated power may be saved to increase energy efficiency or to be utilized during later timeframes when power is increased above a limit. Or in other embodiments, the GPU may not be at a maximum frequency and that freed power from the communication bus and/or CPU may be allocated to the GPU to increase performance.

Although FIG. 10 only illustrates a simplified embodiment of a power balancing algorithm, it may be utilized to understand how any number variations may be used to perform similar balancing, as mentioned above. Moreover, the flow of FIG. 10 was discussed in reference to the logical block diagram of FIG. 9. Therefore, many of the flows were discussed as being performed by an Operating System service routine 920. But these flows, as well as others not depicted, may be performed in hardware, firmware, software, or a combination thereof. For example, a power control unit including a microcontroller and power code may be utilized to perform one or more of the flows. Or specific hardware may be included, such as a small asymmetric core or device tasked with profiling and power balancing type duties. In addition, device microcode may include similar routines. Or light weight profiling software (at a privileged or user level) may be utilized to track these workload and make such balancing decisions.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

What is claimed is:

1. A processor comprising:
a first semiconductor die including:
a plurality of cores including a first core to support out-of-order execution of instructions, the first core having a first cache memory;
a cache memory separate from the plurality of cores, the cache memory to be shared by at least some of the plurality of cores;
a graphics processor;
a memory controller;
a communication bus coupled to the first core, the communication bus to couple the first core and the cache memory;
a core workload monitor to determine a core workload of the first core;
a graphics workload monitor to determine a graphics workload of the graphics processor;
a bus workload monitor to determine a bus workload for the communication bus; and
a power controller to receive the graphics workload and to dynamically balance power between the first core and the graphics processor based at least in part on a power limit for the processor and a comparison between the graphics workload and a graphics threshold, the power limit corresponding to a maximum thermal dissipation capacity for the processor, wherein a power consumption of at least the first core is to be reduced if a thermal value of the processor exceeds the power limit, wherein the power controller is to increase frequency for the graphics processor and cap frequency for the first core if the graphics workload is greater than the graphics threshold, and to reduce the frequency for the graphics processor and increase the frequency for the first core and the communication bus.

2. The processor of claim 1, wherein the power controller is to reduce a power consumption of one of the first core and the communication bus if a thermal value of the processor exceeds the power limit.

3. The processor of claim 1, wherein the power controller is to receive the bus workload and to dynamically balance power between the first core and the communication bus based on the power limit for the processor and a comparison between the bus workload and a bus threshold.

4. The processor of claim 3, wherein the power controller, in response to operation of the processor at the power limit, is to increase frequency for the communication bus and cap the frequency for the first core if the bus workload is greater than the bus threshold, and decrease the frequency for the communication bus and increase the frequency for the first core if the bus workload is less than the bus threshold.

5. The processor of claim 1, wherein the communication bus comprises a ring interconnect, the ring interconnect to couple the first core to the plurality of cores.

6. The processor of claim 1, wherein the processor comprises a system on chip (SoC).

7. The processor of claim 1, wherein the power controller is to reduce the frequency of the first core and to increase the frequency of the graphics processor when the processor is to execute a game application.

8. The processor of claim 1, wherein the power controller is to receive a hint regarding a future workload and to dynamically balance the power further based on the hint.

9. The processor of claim 1, wherein the power controller is to increase the frequency for the graphics processor and to reduce the frequency for the first core when the graphics processor is to execute a producer thread and the first core is to execute a consumer thread to consume information produced by the producer thread.

10. The processor of claim 1, wherein the first core comprises:
a decode logic to decode instructions;
a plurality of execution units to execute the decoded instructions; and
a retirement unit to retire the executed instructions.

11. A non-transitory machine-readable medium having stored thereon instructions, which if performed by a machine cause the machine to perform a method comprising:
executing a first workload on a first core of a processor, the processor including a plurality of cores including a first core to support out-of-order execution of instructions, the first core having a first cache memory, the processor further including a cache memory separate from the plurality of cores, the cache memory to be shared by at least some of the plurality of cores, a graphics processor, a memory controller, a core workload monitor to determine a core workload of the first core, a graphics workload monitor to determine a graphics workload of the graphics processor, a communication bus coupled to the first core, the communication bus to couple the first core and the cache memory, a bus workload monitor to determine a bus workload for the communication bus, and a power controller;
executing a graphics workload on the graphics processor of the processor;
receiving, in the power controller, a measure of the graphics workload;
dynamically balancing, via the power controller, power between the first core and the graphics processor based at least in part on a power limit for the processor and a comparison between the graphics workload and a graphics threshold, the power limit corresponding to a maximum thermal dissipation capacity for the processor;
reducing, by the power controller, a power consumption level of at least the first core when a thermal value of the processor exceeds the power limit;
increasing, by the power controller, a frequency for the graphics processor and capping a frequency for the first core when the graphics workload is greater than the graphics threshold; and
reducing the frequency for the graphics processor and increasing the frequency for the first core and the communication bus.

12. The non-transitory machine-readable medium of claim 11, wherein the method further comprises reducing the frequency of the first core and increasing the frequency of the graphics processor when the processor is executing a game application.

13. The non-transitory machine-readable medium of claim 11, wherein the method further comprises receiving, in the power controller, a hint regarding a future workload and dynamically balancing the power further based on the hint.

14. A system comprising:
a system on chip (SoC) comprising:
a plurality of cores including a first core to support out-of-order execution of instructions, the first core having a first cache memory;
a cache memory separate from the plurality of cores, the cache memory to be shared by at least some of the plurality of cores;
a graphics processor;
a memory controller;
a communication bus coupled to the first core, the communication bus to couple the first core and the cache memory;
a core workload monitor to determine a core workload of the first core;
a graphics workload monitor to determine a graphics workload of the graphics processor,
a bus workload monitor to determine a bus workload for the communication bus; and
a power controller to receive the graphics workload and to dynamically balance power between the first core and the graphics processor based at least in part on a power limit for the SoC and a comparison between the graphics workload and a graphics threshold, the power limit corresponding to a maximum thermal dissipation capacity for the SoC, wherein a power consumption of at least the first core is to be reduced if a thermal value of the SoC exceeds the power limit, wherein the power controller is to increase frequency for the graphics processor and cap frequency for the first core if the graphics workload is greater than the graphics threshold, and to reduce the frequency for the graphics processor and increase the frequency for the first core and the communication bus; and
a dynamic random access memory (DRAM) coupled to the SoC.

15. The system of claim 14, further comprising a point-to-point interconnect to couple the SoC to the DRAM.

16. The system of claim 14, further comprising at least one input/output device coupled to the SoC via a Peripheral Component Interconnect Express (PCIe) interconnect.

* * * * *